(12) United States Patent
Desmond

(10) Patent No.: US 10,015,555 B1
(45) Date of Patent: Jul. 3, 2018

(54) SYSTEMS AND METHODS FOR INTEGRATING A SET-TOP BOX WITH INTERNET CONTENT

(71) Applicant: The DIRECTV Group, Inc., El Segundo, CA (US)

(72) Inventor: Randall Mark Desmond, Lawndale, CA (US)

(73) Assignee: The DIRECTV Group, El Segundo, CA (US)

( * ) Notice: Subject to any disclaimer, the term of this patent is extended or adjusted under 35 U.S.C. 154(b) by 0 days.

(21) Appl. No.: 15/376,819

(22) Filed: Dec. 13, 2016

(51) Int. Cl.
*H04N 21/4782* (2011.01)
*H04N 21/435* (2011.01)
*H04N 21/482* (2011.01)
*H04N 21/6377* (2011.01)
*H04N 21/41* (2011.01)
*H04N 21/64* (2011.01)
(Continued)

(52) U.S. Cl.
CPC ......... *H04N 21/4782* (2013.01); *H04N 21/40* (2013.01); *H04N 21/41* (2013.01); *H04N 21/4108* (2013.01); *H04N 21/4147* (2013.01); *H04N 21/422* (2013.01); *H04N 21/42204* (2013.01); *H04N 21/42207* (2013.01); *H04N 21/42684* (2013.01); *H04N 21/435* (2013.01); *H04N 21/47* (2013.01); *H04N 21/472* (2013.01); *H04N 21/482* (2013.01); *H04N 21/4826* (2013.01); *H04N 21/63* (2013.01); *H04N 21/632* (2013.01); *H04N 21/633* (2013.01); *H04N 21/6332* (2013.01); *H04N 21/6334* (2013.01); *H04N 21/6377* (2013.01); *H04N 21/64* (2013.01); *H04N 21/647* (2013.01); *H04N 21/64746* (2013.01); *H04N 21/64753* (2013.01); *H04N 21/64761* (2013.01)

(58) Field of Classification Search
None
See application file for complete search history.

(56) References Cited

U.S. PATENT DOCUMENTS

| | | | |
|---|---|---|---|
| 5,990,883 | A | 11/1999 | Byrne et al. |
| 6,757,707 | B1 | 6/2004 | Houghton et al. |

(Continued)

FOREIGN PATENT DOCUMENTS

| | | | |
|---|---|---|---|
| EP | 2396731 A1 | | 12/2011 |
| EP | 2760217 A1 | | 7/2014 |
| WO | WO 2014/154868 A1 | | 10/2014 |

OTHER PUBLICATIONS

Concolato; "Generation, Streaming and Presentation of Electronic Program Guide"; Proc. European Interactive TV Conf.; 2009; 4 pages.

(Continued)

*Primary Examiner* — Justin Shepard
(74) *Attorney, Agent, or Firm* — Baker & Hostetler LLP

(57) ABSTRACT

Methods, systems and computer readable media for controlling a set-top box includes receiving at processor a request from a user to access a web page. The content of the web page is scanned at the processor for items relating to content that may be available through the set-top box. The processor then provides a web page to the user with an embedded widget which the user can use to select commands to be executed by the set-top box. The processor receives the widget command and sends the widget command to the set-top box for implementation.

17 Claims, 4 Drawing Sheets

(51) Int. Cl.
*H04N 21/4147* (2011.01)
*H04N 21/63* (2011.01)
*H04N 21/472* (2011.01)
*H04N 21/422* (2011.01)
*H04N 21/426* (2011.01)
*H04N 21/633* (2011.01)
*H04N 21/40* (2011.01)
*H04N 21/6332* (2011.01)
*H04N 21/647* (2011.01)
*H04N 21/6334* (2011.01)
*H04N 21/47* (2011.01)

(56) References Cited

U.S. PATENT DOCUMENTS

| | | |
|---|---|---|
| 8,566,874 B2 | 10/2013 | Roberts et al. |
| 8,832,739 B2 | 9/2014 | Raine et al. |
| 8,862,659 B2 | 10/2014 | Blanchard et al. |
| 8,955,001 B2 | 2/2015 | Bhatia et al. |
| 8,990,847 B2 * | 3/2015 | Aldrey ............... H04N 5/76 725/112 |
| 9,071,797 B2 | 6/2015 | Mukerji et al. |
| 9,071,878 B2 | 6/2015 | White et al. |
| 9,118,884 B2 | 8/2015 | Hao et al. |
| 9,225,930 B2 | 12/2015 | Ayling et al. |
| 9,264,751 B2 | 2/2016 | Sarosi et al. |
| 2005/0204382 A1 | 9/2005 | Ellis |
| 2007/0180485 A1* | 8/2007 | Dua ............... H04L 29/06027 725/114 |
| 2009/0052863 A1 | 2/2009 | Parmar et al. |
| 2010/0031296 A1 | 2/2010 | Elias et al. |
| 2010/0205628 A1 | 8/2010 | Davis et al. |
| 2011/0078174 A1 | 3/2011 | Lee et al. |
| 2011/0167447 A1 | 7/2011 | Wong |
| 2015/0271544 A1 | 9/2015 | White et al. |
| 2016/0007074 A1 | 1/2016 | Marsh et al. |
| 2016/0080822 A1 | 3/2016 | Ayling et al. |
| 2016/0156987 A1 | 6/2016 | Paul et al. |

OTHER PUBLICATIONS

Jung et al.; "Guide—Adaptive User Interfaces for Accessible Hybrid TV Applications"; Second W3C Workshop Web & TV; 2011; 5 pages.

Kim et al.; "Research on User Customized Social Mobile Platform base on Personalized TV through IP Networks"; Int'l Journal of Multimedia and Ubiquitous Engineering; vol. 9 No. 7; 2014; p. 159-170.

* cited by examiner

SYSTEMS AND METHODS FOR INTEGRATING A SET-TOP BOX WITH INTERNET CONTENT

TECHNICAL FIELD

The present disclosure relates generally to control systems for set-top boxes and more specifically to the control of a set-top box in response to a user selection of commands displayed in a widget associated with web page content.

BACKGROUND

Digital broadcast systems provide a wide variety of content to users. A digital broadcast television system typically includes a set-top box that is used to receive the satellite signals and decode the satellite signals for use on a television. The set-top box typically has a memory that includes a digital video recorder or the like as well as the operating code for the set-top box. In an intelligent set-top box, information and instructions associated with receiving and processing digital broadcast signals are stored in a memory unit of the set-top box and executed by a processor. With a bi-directional set-top box, in addition to receiving broadcast signals, a subscriber can transmit messages to the digital broadcast system operator.

There are numerous ways to identify digital broadcast content. For example, a set-top box may provide the user with a schedule of programs from which the user can select instructions to the set-top box such as schedule, display, record, etc. Another way of identifying digital broadcast content is to perform a web search for such content. However users performing such web searches would typically have to manually access their set-top box to schedule and/or record the content.

There is a need for a method whereby a user can use the results of a web search to provide instructions to a set-top box without manually accessing the set-top box.

SUMMARY

A method for controlling a set-top box includes the step of receiving at a processor a request from the user to access a web page. The content of the web page is scanned at the processor for items relating to content that may be available through the set-top box. The processor then provides a web page to the user with an embedded widget which the user can use to select commands to be executed by the set-top box. The processor receives the widget command and sends the widget command to the set-top box for implementation.

A system for controlling a set-top box comprises a processor in communication with the storage device coupled to a registrations server. The processor executes a method for controlling the set-top box including receiving at the proxy server a request from the user to access a web page; scanning the web page content for items relating to set-top box content that may be available through the set-top box; and providing the web page to the user with an embedded widget. The user may use the embedded widget to select commands to be provided to the set-top box. The commands are received by the processor and sent to the set-top box for implementation.

A computer readable medium is provided with computer executable instructions that when executed by a computer cause the computer to perform a method comprising receiving at a processor a request from the user to access a web page and responsive to the request, scanning the web page content for items relating to set-top box content that may be available to a set-top box. The user is thereafter provided with a web page having an embedded widget that provides the user with a menu of commands to be implemented by the set-top box. The processor receives a widget command from the user and sends the widget command to the set-top box for implementation.

DETAILED DESCRIPTION OF ILLUSTRATIVE EMBODIMENTS

Figure 1:
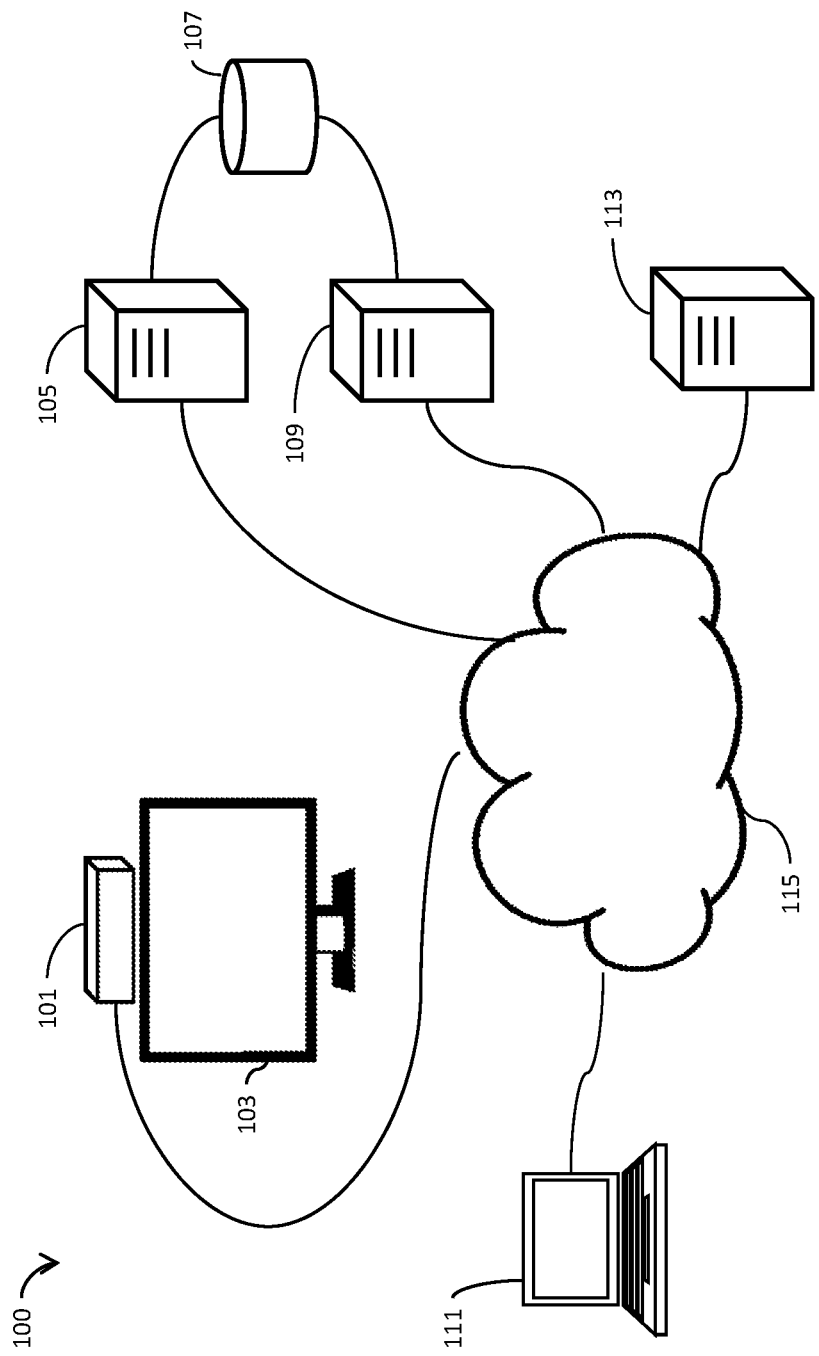
FIG. 1 is a block diagram of an exemplary system for integrating a set-top box with Internet content.

Illustrated in FIG. 1 is a block diagram of an exemplary system 100 for integrating a set-top box with Internet content. The system 100 includes a set-top box 101, a television or other display device 103, a registration server 105 coupled to a storage device 107 and a processor 109. The system 100 may also include a user equipment 111 and a content server 113 connected to a network 115, such as the internet. User equipment 111 may include a computer, a laptop, a mobile phone, a tablet, a netbook, or any other device capable of conducting a web search. The content server 113 may be a server that hosts web pages that deliver web page content to users.

The registration server 105 registers the set-top box as an Internet controllable set-top box, and stores information regarding the registration in the storage device 107 which includes a secure database of all such registered set-top boxes. Processor 109 may function as an Internet proxy server for users of the set-top box 101 when such users are surfing the Internet on a user equipment 111.

The user may use the set-top box 101 to register the set-top box 101 as an Internet controllable set-top box with the registration server 105. The registration server 105 records the information about the set-top box 101 on the secure database of registered set-top boxes in storage device 107. The registration is performed using a set-top box registration request software program on the set-top box 101 and a set-top box registrar program on the registration server 105. The registration server 105 specifies two URLs. The first is a unique URL which provides private data to the provider of set-top box content to the set-top box 101 and affords access to the set-top box 101 via a secure connection (such as SSL, port forwarding tunneling, etc.). The second URL is a special web surfing URL that is delivered to the user from the registration server 105 to the set-top box 101 and which the user then enters into a web browser. The method of delivery to the user of the second URL could take on several forms: delivered to the STB, delivered via email as a link or even a script which when run in a browser would configure the settings of the browser, it could even be embedded in a browser plugin for which a link is sent to the user and they install the plugin such that they never even have to do any manual configuration of the processor settings.

Figure 2:
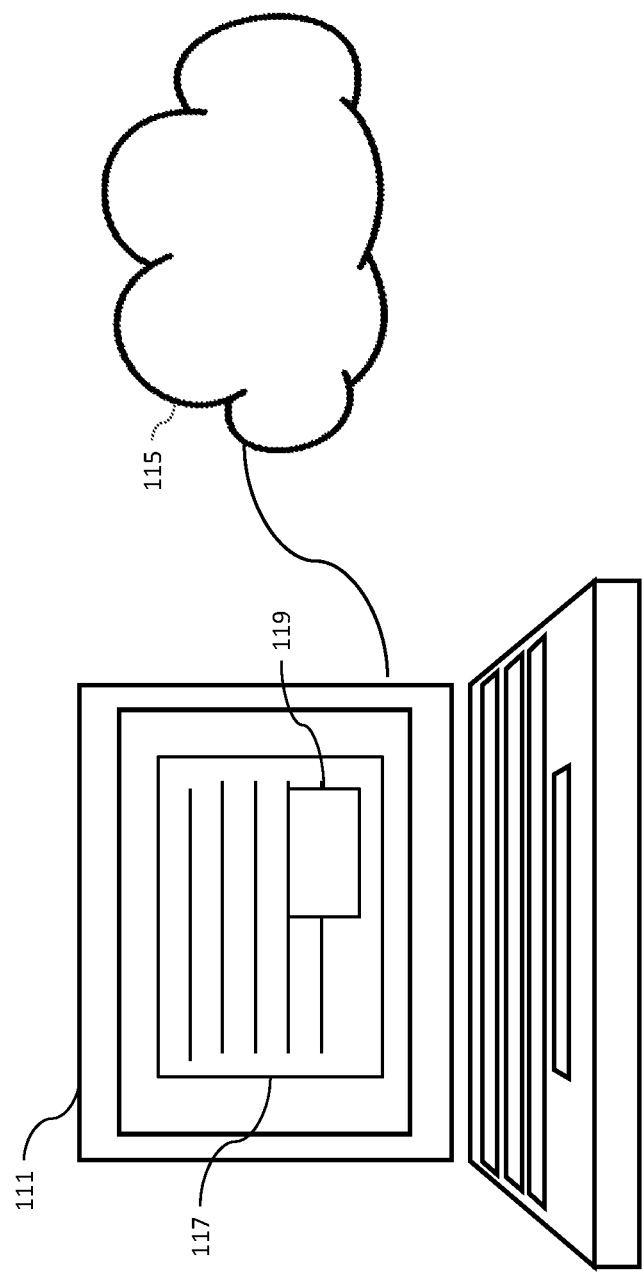
FIG. 2 is an illustration of a web page display on a user equipment.

The user searches the Internet with a web browser using the second URL. When the user identifies a web page to be retrieved the web page contents are scanned by the processor 109 to identify content of interest that may be accessible through the set-top box 101. Such content of interest may include movie titles, cast, crew, genre, names of actors, channels, television program titles, and the like. FIG. 2 illustrates the display of the result of the search on the user equipment 101, including the web page display 117 and a widget 119. Widget 119 is a small application that can display information, display commands and/or interact with the user. A widget can be as rudimentary as a button, scroll bar, label, dialog box or check box.

If any content of interest is identified the processor 109 a widget 119 may be embedded on the web page 117 to enable the user to select from a list of options to instruct an action on the set-top box 101. The widget 119 may include instructions such as search, display, record, schedule, or any other action that may be effected by the set-top box 101. The widget 119 may be programmed to be displayed when the user moves a cursor over the content of interest, for example a movie title. When the user selects an instruction from the widget 119, such as for example—record—, the widget 119 will send the user selection data to the processor 109 which, in turn sends the appropriate command to the set-top box 101 via the secure connection. The set-top box 101 can communicate back to the widget via the processor 109. A successful command to the set-top box 101 is reflected back to the widget so the user knows they have accomplished the task.

Figure 3:
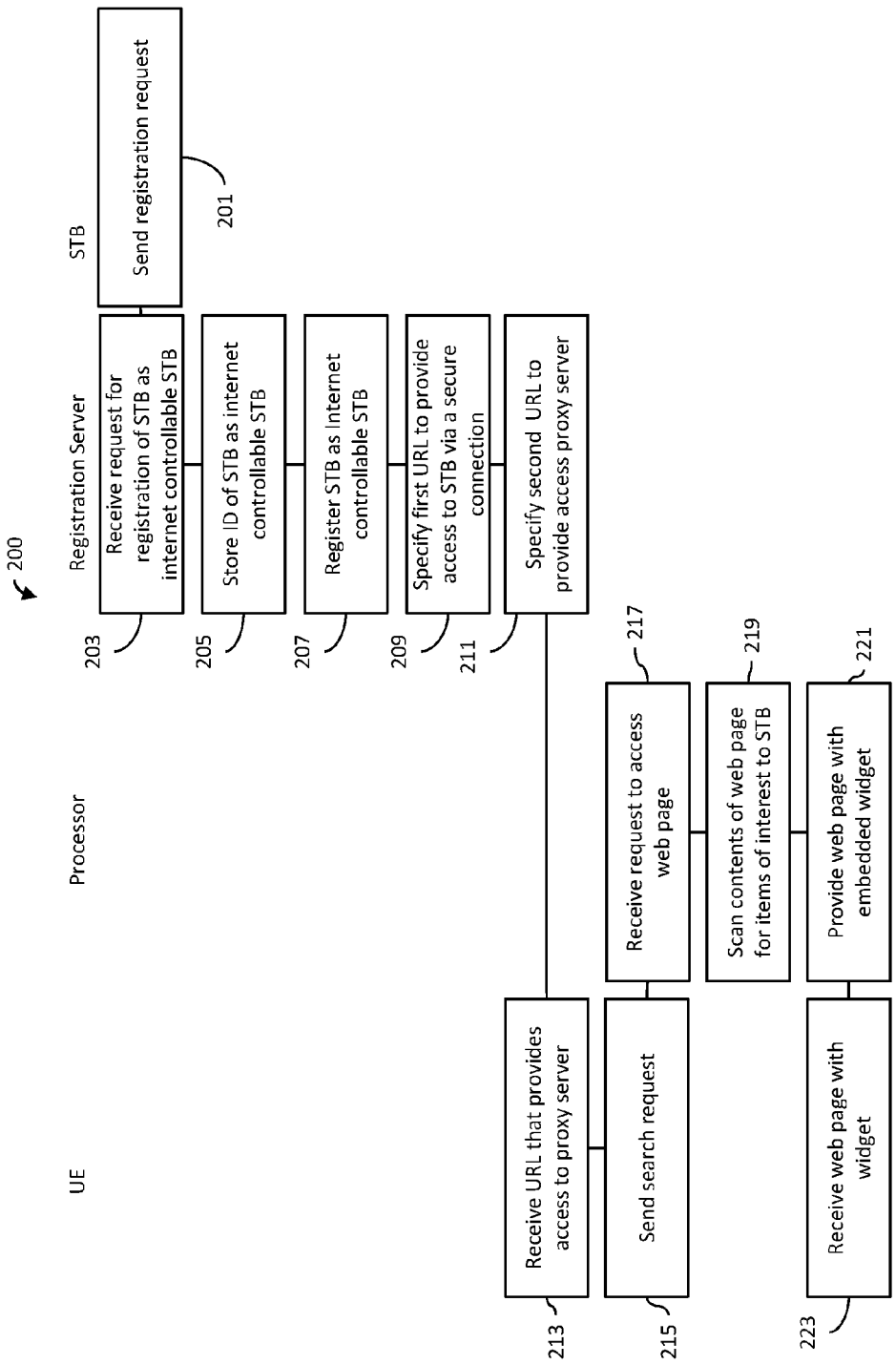
FIG. 3 is a flowchart of a method for providing a user with the capability of controlling a set-top box from a web page.

Illustrated in FIG. 3 is a flowchart of a method 200 for providing a user with the capability of controlling a set-top box from a web page.

In step 201 a registration request is sent from the set-top box 101 to the registration server 105.

In step 203 the registration server 105 receives a request for registration of the set-top box 101 as an Internet controllable set-top box 101.

In step 205 the registration server 105 stores the information associated with the set-top box 101 identifying the set-top box 101 as an Internet controllable set-top box. The information may be stored in on a database the data store 107.

In step 207 the registration server 105 registers the set-top box 101 as an Internet controllable set-top box.

In step 209 the registration server 105 specifies a first URL to provide access to the set-top 101 box via a secure connection.

In step 211 the registration server 105 specifies a second URL to provide access to the processor 109.

In step 213 the user equipment 111 receives the URL that provides access to the processor 109.

In step 215 the user sends a search request to the processor 109.

In step 217 the processor 109 receives a request to access a web page.

In step 219 the processor 109 scans the content of the web page for content of interest that may be accessed by the set-top box 101.

In step 221 the processor provides a web page 117 with an embedded widget 119.

In step 223 the user equipment 111 receives the web page 117 with the embedded widget 119.

Figure 4:
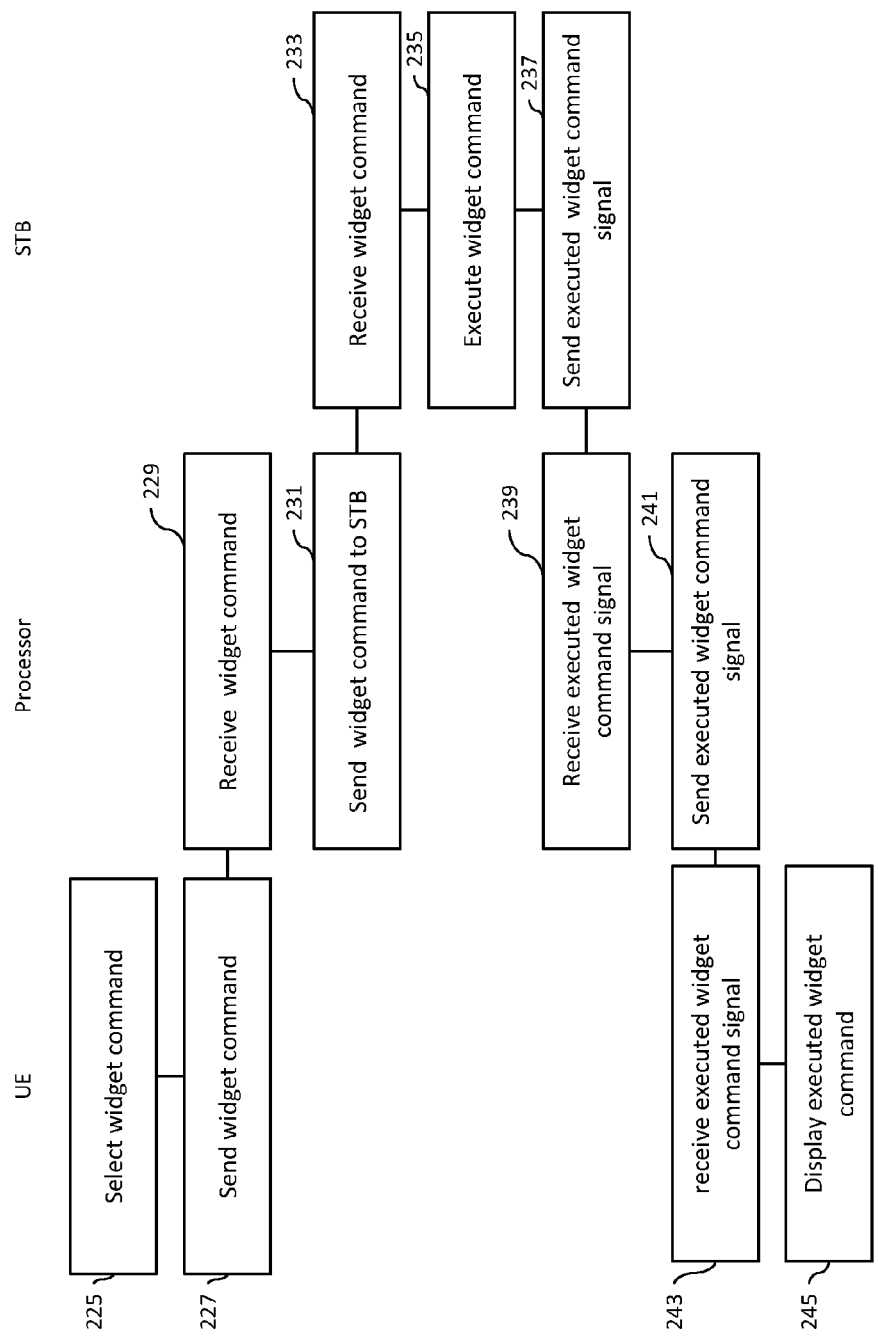
FIG. 4 is a flowchart of a method for controlling a set-top box from a web page.

As shown in FIG. 4, the user may in step 225 select a widget command associated with content that may be available through the set-top box 101. For example, the web page may include the title of a movie and the widget 119 may display a menu of commands such as search, schedule, play, record, bookmark a particular time within a piece of content, etc.

In step 227 the user may send the widget command to the processor 109.

In step 229 the processor 109 receives the widget command.

In step 231 the processor 109 sends the widget command to the set-top box 101.

In step 233 the set-top box 101 receives the widget command.

In step 235 the set-top box 101 executes the widget command.

In step 237 the set-top box sends an executed widget command signal to the processor 109.

In step 239 the processor 109 receives the executed widget command signal.

In step 241 the processor 109 sends the executed widget command signal to the user equipment 111.

In step 243 the user equipment 111 receives the executed widget command signal.

In step 245 the user equipment 111 displays the executed widget command signal.

In one embodiment the processor 109 is a proxy server connected to the set-top box through the network 115.

In another embodiment the processor 109 is the set-top box 101.

In yet another embodiment the processor is embedded in the set-top box 101

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item. Numerous additional modifications and variations of the present invention are possible in light of the above teachings. It is therefore to be understood that within the scope of the appended claims, the invention may be practiced otherwise than as specifically described herein.

What is claimed:

1. A method for controlling a set-top box comprising:
    receiving at a registration server a request from a user equipment to register the set-top box as an internet controllable set-top box and specify a first URL and a second URL, wherein the first URL provides private data to a provider of set-top box content to the set-top box and affords access to the set-top box via a secure connection, and the second URL is a web surfing URL;
    receiving at a processor a request from the user equipment to access a web page having a web page content using the second URL;
    receiving at the processor instructions to scan the web page content for items relating to set-top box content that may be available through the set-top box;

scanning the web page to identify the items relating to the set-top box content;

embedding a widget on the webpage wherein the widget enables the user equipment to provide the user equipment with a list of options related to the items to instruct an action on the set-top box;

receiving at the processor from the user equipment a widget command in response to a selection from the list of options;

sending the widget command to the set-top box;

receiving at the processor an executed widget command; and sending an executed widget command signal to the user.

2. The method of claim 1 wherein the processor is the set-top box.

3. The method of claim 1 wherein the processor is a proxy server.

4. The method of claim 3 wherein communications between the proxy server and the set-top box use a secure connection.

5. The method of claim 1 further comprising encoding the items whereby the embedded widget displays a list of command options when a cursor hovers over the item.

6. The method of claim 1 wherein the items comprise items selected from among a group comprising pictures, videos, and text.

7. A system for controlling a set-top box comprising:

a processor in communication with a storage device and a registration server, wherein the processor executes a method for controlling the set-top box comprising:

receiving at a registration server a request from a user equipment to register the set-top box as an internet controllable set-top box and specify a first URL and a second URL, wherein the first URL provides private data to a provider of set-top box content to the set-top box and affords access to the set-top box via a secure connection, and the second URL is a web surfing URL;

receiving at the processor a request from the user equipment to access a web page having web page content using the second URL;

receiving at the processor instructions to scan the web page content for items relating to set-top box content that may be available through the set-top box;

scanning the web page to identify the items relating to the set-top box content;

embedding a widget on the webpage wherein the widget enables the user equipment to provide the user equipment with a list of options related to the items to instruct an action on the set-top box;

receiving at the processor from the user equipment a widget command in response to a selection from the list of options;

sending the widget command to the set-top box;

receiving at the processor an executed widget command; and sending an executed widget command signal to the user.

8. The system of claim 7 wherein the processor is the set-top box.

9. The system of claim 7 wherein the processor is a proxy server.

10. The system of claim 9 wherein communications between the proxy server and the set-top box use a secure connection.

11. The system of claim 7 wherein the processor executes a method for controlling the set-top box further comprising encoding the items whereby the embedded widget displays a list of command options when a cursor hovers over the item.

12. The system of claim 7 wherein the items comprise items selected from among a group comprising pictures, videos, and text.

13. A non-transitory computer-readable medium having computer-executable instructions stored thereon which, when executed by a computer, cause the computer to perform a method comprising:

receiving at a registration server a request from a user equipment to register a set-top box as an internet controllable set-top box and specify a first URL and a second URL, wherein the first URL provides private data to a provider of set-top box content to the set-top box and affords access to the set-top box via a secure connection, and the second URL is a web surfing URL;

receiving at a processor a request from the user equipment to access a web page having web page content using the second URL;

receiving at the processor instructions to scan the web page content for items relating to set-top box content that may be available through the set-top box;

scanning the web page to identify the items relating to the set-top box content;

embedding a widget on the webpage wherein the widget enables the user equipment to provide the user equipment with a list of options related to the items to instruct an action on the set-top box;

receiving at the processor from the user equipment a widget command in response to a selection from the list of options;

sending the widget command to the set-top box receiving at the processor an executed widget command; and sending an executed widget command signal to the user.

14. The non-transitory computer-readable medium of claim 13, wherein the processor is the set-top box.

15. The non-transitory computer-readable medium of claim 13, wherein the processor is a proxy server.

16. The non-transitory computer-readable medium of claim 13 further comprising encoding the items whereby the embedded widget displays a list of command options when a cursor hovers over the item.

17. The non-transitory computer-readable medium of claim 15 wherein communications between the proxy server and the set-top box use a secure connection.

* * * * *